United States Patent
Liebert

(10) Patent No.: US 11,448,270 B2
(45) Date of Patent: Sep. 20, 2022

(54) CLUTCH ASSEMBLY FOR A MOTOR VEHICLE DRIVE TRAIN, AND MOTOR VEHICLE DRIVE TRAIN

(71) Applicant: Bayerische Motoren Werke Aktiengesellschaft, Munich (DE)

(72) Inventor: Sebastian Liebert, Unterfoehring (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 24 days.

(21) Appl. No.: 16/972,729

(22) PCT Filed: Jul. 17, 2019

(86) PCT No.: PCT/EP2019/069175
§ 371 (c)(1),
(2) Date: Dec. 7, 2020

(87) PCT Pub. No.: WO2020/030391
PCT Pub. Date: Feb. 13, 2020

(65) Prior Publication Data
US 2021/0262533 A1   Aug. 26, 2021

(30) Foreign Application Priority Data
Aug. 8, 2018 (DE) .................... 10 2018 213 275.5

(51) Int. Cl.
*F16D 41/12* (2006.01)
*F16D 27/118* (2006.01)

(52) U.S. Cl.
CPC ............ *F16D 41/12* (2013.01); *F16D 27/118* (2013.01)

(58) Field of Classification Search
CPC ................... F16D 41/12–16; F16D 27/10–118
See application file for complete search history.

(56) References Cited

U.S. PATENT DOCUMENTS

2014/0102844 A1   4/2014   Greene et al.
2014/0318923 A1   10/2014  Arndt et al.
(Continued)

FOREIGN PATENT DOCUMENTS

CN   103754082 A   4/2014
CN   104736872 A   6/2015
(Continued)

OTHER PUBLICATIONS

Chinese-language Office Action issued in Chinese Application No. 201980038905.9 dated Nov. 2, 2021 with English translation (16 pages).

(Continued)

*Primary Examiner* — David R Morris
(74) *Attorney, Agent, or Firm* — Crowell & Moring LLP

(57) ABSTRACT

A clutch assembly for the drive train of a motor vehicle includes a ratchet pawl carrier, which can be coupled to a first coupling element in a rotationally fixed manner, and a ratchet pawl counter element, which can be coupled to a second coupling element in a rotationally fixed manner. In a coupled state, ratchet pawls fastened to the ratchet pawl carrier engage in respective associated coupling recesses provided on the ratchet pawl counter-element. In a decoupled state, the ratchet pawls are positioned outside the coupling recesses. Each of the locking pawls is thereby loaded into a first locking pawl position by means of a respective associated spring, and can be loaded into a second locking pawl position by means of an associated actuating tappet.

20 Claims, 3 Drawing Sheets

(56) References Cited

U.S. PATENT DOCUMENTS

| | | | |
|---|---|---|---|
| 2017/0138414 A1 | | 5/2017 | Cioc et al. |
| 2017/0138416 A1* | | 5/2017 | Lee ................. F16D 23/14 |
| 2017/0343061 A1* | | 11/2017 | Campton ........... F16D 41/16 |
| 2018/0010651 A1* | | 1/2018 | Kimes ............... F16H 63/304 |
| 2018/0100551 A1 | | 4/2018 | Campton et al. |
| 2019/0170198 A1 | | 6/2019 | Kimes |
| 2022/0010855 A1* | | 1/2022 | Liebert ............. F16D 27/004 |

FOREIGN PATENT DOCUMENTS

| | | |
|---|---|---|
| CN | 104781571 A | 7/2015 |
| CN | 106030143 A | 10/2016 |
| CN | 106286637 A | 1/2017 |
| DE | 10 2010 060 590 A1 | 5/2012 |
| DE | 10 2014 207 846 A1 | 10/2015 |
| DE | 10 2015 205 305 A1 | 10/2015 |
| DE | 10 2014 217 599 A1 | 3/2016 |
| DE | 10 2015 204 660 A1 | 9/2016 |
| DE | 11 2016 001 214 T5 | 11/2017 |
| DE | 102019126422 A1 * | 4/2021 |
| JP | 2017-180580 A | 10/2017 |

OTHER PUBLICATIONS

International Search Report (PCT/ISA/210) issued in PCT Application No. PCT/EP2019/069175 dated Nov. 4, 2019 with English translation (four (4) pages).

German-language Written Opinion (PCT/ISA/237) issued in PCT Application No. PCT/EP2019/069175 dated Nov. 4, 2019 (six (6) pages).

German-language Search Report issued in German Application No. 10 2018 213 275.5 dated Feb. 12, 2019 with partial English translation (11 pages).

Chinese-language Office Action issued in Chinese Application No. 201980038905.9 dated May 25, 2022 with English translation (15 pages).

* cited by examiner

CLUTCH ASSEMBLY FOR A MOTOR VEHICLE DRIVE TRAIN, AND MOTOR VEHICLE DRIVE TRAIN

BACKGROUND AND SUMMARY OF THE INVENTION

The invention relates to a clutch assembly for a motor vehicle drive train, having a pawl carrier which can be coupled in a rotationally fixed manner to a first coupling element which can be rotated about an axis of rotation, wherein a plurality of pawls are pivotably fastened on the pawl carrier, and having a pawl counter element which can be coupled in a rotationally fixed manner to a second coupling element which can be rotated about the axis of rotation. In a coupled state, each of the pawls engages in the circumferential direction in a form-fitting manner into a coupling recess provided on the pawl counter element, with the result that the pawl carrier and the pawl counter element are coupled in a rotationally fixed manner at least in one direction of rotation. In an uncoupled state, the pawls are positioned outside the coupling recesses, with the result that the pawl counter element and the pawl carrier are rotationally uncoupled from one another.

Furthermore, the invention relates to a motor vehicle drive train having such a clutch assembly.

Such clutch assemblies and motor vehicle drive trains equipped therewith are known from the prior art.

In the field of motor vehicle drive trains, the coupling elements are generally shafts. Thus, in the uncoupled state, it is not only the pawl counter element and the pawl carrier that are rotationally uncoupled from one another but also the first and the second coupling element, that is to say a first and a second shaft. The same analogously applies to the coupled state.

Clutch assemblies whose operating principle is based on pawls can be configured as switchable clutches. It is important in such clutches for the desired switching state, that is to say the coupled state and the uncoupled state, to be reached quickly and reliably. It is only in this way that the clutch assembly can be operated in an operationally reliable manner. Moreover, quick switching operations are necessary, particularly in the field of motor vehicles, in order for example to avoid traction force interruptions.

Against this background, it is the object of the present invention to provide a clutch assembly which is improved with regard to the aforementioned aspects. In particular, the clutch assembly is thus intended to allow quick and reliable switching operations.

The object is achieved in that each of the pawls is urged into a first pawl position by means of a respectively assigned spring, and each of the pawls can be urged into a second pawl position counter to the urging of the respectively assigned spring by means of a respectively assigned actuating tappet mounted on the pawl carrier, wherein the actuating tappets are mounted on the pawl carrier via a carriage and are rigidly connected to the carriage in the direction of the axis of rotation. In this connection, the term "spring" is to be understood broadly. What is thus meant is any component which can urge the pawls as a result of elastic deformation. The first pawl position is thus achieved by means of the respectively assigned springs when the pawls are not urged by the respectively assigned actuating tappets. In the converse case, that is to say when the pawls are urged by the respectively assigned actuating tappets, the actuating tappets ensure that the pawls assume the respective second pawl position. It is thus the case that not only are the individual pawls always in a defined position, but also the overall clutch assembly is always in a defined state, namely the coupled state or the uncoupled state. An operationally reliable operation of the clutch assembly is ensured as a result. By virtue of the spring loading, the first pawl position is moreover comparatively quickly assumed. The same applies to the second pawl position being assumed, with the pawls being moved by the actuating tappets into this position corresponding to an actuating speed. Switching operations can thus proceed in a comparatively quick manner.

The carriage can be of annular configuration and engage circumferentially around the pawl carrier. The pawls can consequently be transferred from the first pawl position into the second pawl position, and vice versa, via a movement of the carriage. The carriage preferably rotates here together with the pawl carrier about the axis of rotation. In other words, the carriage is nonrotatable relative to the pawl carrier. This comparatively simple actuating movement of the carriage means, on the one hand, that the pawls can be quickly transferred from the first pawl position into the second pawl position, and vice versa. Furthermore, the carriage has the effect that all the pawls are actuated substantially simultaneously. This allows the clutch assembly to have quick and reliable switching operations.

Quick and reliable switching operations of the clutch assembly are also ensured by the rigid coupling of the actuating tappets on the carriage. Here, a movement of the carriage is transmitted directly to the actuating tappets. The actuating tappets can thus be controlled via the carriage in a precise and quick manner. Consequently, the positions of the pawls can also be controlled in a precise and quick manner. Moreover, in this way, the construction of the carriage and the connection of the actuating tappets to the carriage are simple, in particular because a small number of components is required. This results in a simple assembly of the clutch assembly. In addition, a clutch assembly having a low weight can thus be created.

According to one embodiment, in the uncoupled state, the pawls assume the first pawl position and, in the coupled state, the second pawl position. What is involved in this embodiment is thus a so-called normally-open clutch. This means that the clutch assembly in the unactuated state is in the uncoupled state.

Of course, it is also possible for the clutch assembly to be configured as a so-called normally-closed clutch. In that case, the first pawl position is associated with the coupled state of the clutch assembly, and the second pawl position is associated with the uncoupled state. Such a clutch assembly is thus closed in the unactuated state.

Whether the clutch assembly is configured as a normally-open or normally-closed clutch must be decided on the basis of the application situation in which the clutch assembly is used.

The carriage is preferably displaceable with respect to the pawl carrier only along the axis of rotation. The actuating tappets can thus be moved toward or away from the respectively assigned pawls by means of the carriage in a movement direction corresponding to the axis of rotation. All other relative movements of the carriage with respect to the pawl carrier are blocked. In particular, the carriage is nonrotatable relative to the pawl carrier. The construction of the clutch assembly is thus simple. Moreover, a high degree of operational reliability with precise and quick control of the actuating tappets can thus be combined. This allows the clutch assembly to have particularly quick and reliable switching operations.

In a variant, the carriage can latch in on the pawl carrier in predefined positions along the axis of rotation. In other words, the carriage can have a latching function. Here, the latching function can be based on a magnetic operating principle. The carriage is then held magnetically via reluctance forces in the predefined position in the de-energized state. Alternatively, the latching function can be realized mechanically, for example via a ball latch. In the case that the carriage can assume two predefined positions on the pawl carrier, the clutch assembly can thus be configured as a bistable clutch.

Alternatively or additionally, the actuating tappets are each connected to the carriage without intermediate elements. In other words, the actuating tappets are fastened directly on the carriage. As a result, the assembly formed from the actuating tappets and the carriage comprises only few components. The effects and advantages already stated with respect to the rigid connection result.

The carriage can be connected to an actuator in such a way that it is movable along the axis of rotation at least into a first carriage position and a second carriage position, wherein the first carriage position is associated with the coupled state, and the second carriage position is associated with the uncoupled state. Of course, it is also possible for the first carriage position to be associated with the uncoupled state and for the second carriage position to be associated with the coupled state. The clutch assembly can thus be used in a wide application field. Moreover, simple and quick switchability of the clutch assembly is achieved.

The actuator can comprise a carriage-side magnet arrangement which is connected to the carriage, wherein the carriage-side magnet arrangement can be acted upon by a stator-side magnet arrangement. In this connection, the stator-side magnet arrangement can comprise a magnet coil for each predetermined position of the carriage. For the case that the clutch assembly is to be switched into an uncoupled state and a coupled state, two magnet coils are thus provided within the stator-side magnet arrangement. They can be energized selectively or else in combination. Depending on which of the magnet coils is energized and in which direction the current flows through the respectively energized magnet coil or the energized magnet coils, the carriage is moved via the carriage-side magnet arrangement into an associated position. It is thus possible for the carriage to be moved quickly and reliably into the desired position.

In a preferred embodiment, the stator-side magnet arrangement is mounted on a housing of the clutch assembly.

In a variant, the carriage-side magnet arrangement and the stator-side magnet arrangement act as a magnetic spring element via which the carriage is supported on the stator. If the stator-type magnet arrangement is fastened on a housing of the clutch assembly, the carriage is thus resiliently supported on the housing. A magnetic field emanates both from the carriage-side magnet arrangement and from the stator-side magnet arrangement. These two magnetic fields are thus superimposed in a region between the magnet arrangements. Depending on the orientation of these magnetic fields with respect to one another, the carriage is thus attracted by the stator or repelled by the stator, wherein the attraction and repulsion forces can be dependent on the relative position of the carriage with respect to the stator and the relative speed of the carriage with respect to the stator. The attraction and repulsion forces thus act as spring forces and/or as damper forces.

Furthermore, a sensor arrangement can be provided by means of which a position of the carriage along the axis of rotation can be detected. Since the actuating tappets are fixedly connected to the carriage, a position of the actuating tappets is thus also detected. It is thus possible by way of the sensor arrangement to determine whether the actuating tappets actually interact in the desired manner with the respectively assigned pawls. The sensor arrangement thus also allows a position of the pawls to be detected. The sensor arrangement thus also constitutes a means for detecting whether the clutch assembly is in the uncoupled state or in the coupled state. This is particularly important when the clutch assembly is integrated in a motor vehicle drive train. Specifically, in such an application case, it must first of all be ensured that the clutch assembly is in the coupled state, that is to say the clutch is closed, before it can be used for torque transmission. This can be realized in a simple and reliable manner by means of the sensor arrangement. As a result, the clutch assembly is particularly operationally reliable. Furthermore, there are avoided so-called torque surges or torque impacts which occur when torque is applied to a clutch which has not yet completely reached the coupled state. This leads to an increased service life of the clutch assembly and to a higher degree of switching comfort. By comparison with known clutch assemblies in which, instead of using a sensor arrangement, only a certain time interval is awaited to ensure that the pawls are situated in the position associated with the coupled state, it is possible by means of the clutch assembly according to the invention to enable the torque transmission very much more quickly. Particularly quick switching operations are thus possible.

In a preferred embodiment, a position control circuit for the carriage is provided which comprises the actuator and the sensor arrangement, with the result that a position of the carriage along the axis of rotation can be controlled. It is thus also possible for the interaction between the actuating tappets and the corresponding pawls to be controlled. Particularly precise and quick switching operations can thus be implemented.

Each of the actuating tappets preferably interacts with the respectively assigned pawl via a contact surface which tapers in the direction of the pawl-side tappet end, in particular wherein the contact surface comprises a cone portion. At least a certain proportion of the contact surface is thus formed by a cone portion. It is thus ensured that the respectively assigned pawl is gently engaged by said cone portion, and the actuating tappet gently releases the assigned pawl. There thus results a substantially jerk-free switching behavior of the clutch assembly. In a preferred embodiment, the entire contact surface takes the form of a cone surface. The aforementioned effects and advantages result to a particularly high degree.

In a variant, the pawls form two groups, wherein the pawls of a first group can produce rotationally fixed coupling of the pawl carrier with the pawl counter element in a first direction of rotation, and the pawls of a second group can produce rotationally fixed coupling of the pawl carrier with the pawl counter element in a second direction of rotation, wherein the second direction of rotation is opposite to the first direction of rotation. The coupling of the pawl carrier and of the pawl counter element thus occurs in two mutually opposite directions of rotation. Variants in which the rotational coupling takes place only in a single direction of rotation are of course also conceivable.

Furthermore, the object is achieved by a motor vehicle drive train of the type stated at the outset that comprises a clutch assembly according to the invention. In such a motor vehicle drive train, different torque-channeling portions thereof can be connected in a torque-transmitting manner and uncoupled from one another in a quick and precise manner.

The clutch assembly can act in a summing transmission assembly by means of which a first electric drive motor and/or a second electric drive motor or the first electric drive motor and/or an internal combustion engine can be coupled to a torque output of the motor vehicle drive train in a torque-transmitting manner. It is thus possible in a simple and quick manner for the first electric drive motor, the second electric drive motor or both electric drive motors to be connected to the torque output, in particular the driven wheels of a motor vehicle, in a torque-transmitting manner or to be uncoupled from one another. The same applies to the variant in which the first electric drive motor and an internal combustion engine are provided. In that case, the first electric drive motor, the internal combustion engine or both can be connected to the torque output, in particular the driven wheels of the motor vehicle, in a torque-transmitting manner or uncoupled from one another. In all alternatives, the coupling and uncoupling takes place quickly and reliably.

The invention will be explained below with reference to an exemplary embodiment which is shown in the appended drawings.

DETAILED DESCRIPTION OF THE DRAWINGS

Figure 1:
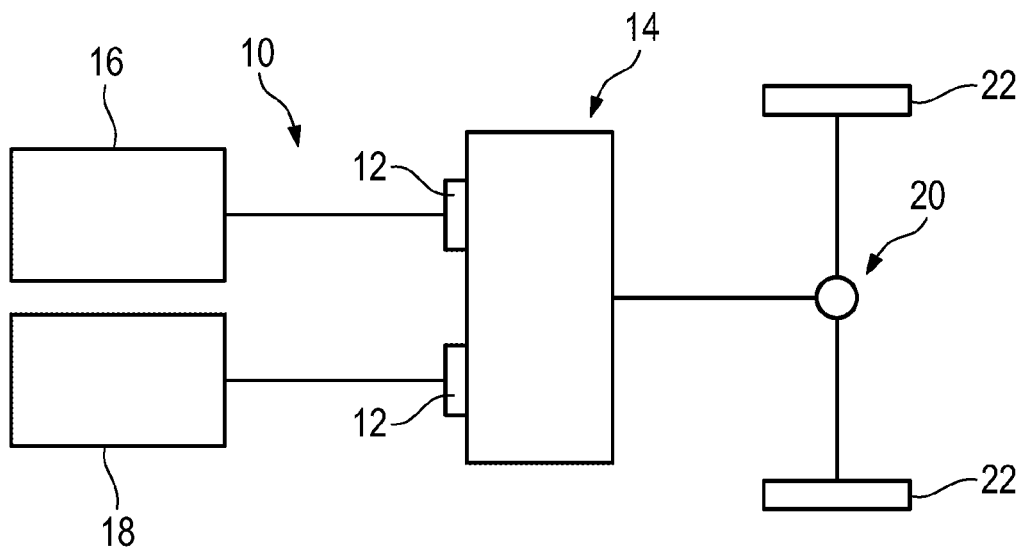
FIG. 1 shows a motor vehicle drive train according to an embodiment of the invention having two clutch assemblies.

FIG. 1 shows a motor vehicle drive train 10 in which two clutch assemblies 12 are provided.

Both clutch assemblies 12 act in a summing transmission assembly 14 by means of which a first electric drive motor 16 and/or a second electric drive motor 18 can be coupled to a torque output 20 of the motor vehicle drive train 10 in a torque-transmitting manner.

In the embodiment illustrated, two wheels 22 of the motor vehicle having the motor vehicle drive train 10 are coupled to the torque output 20 in a torque-transmitting manner.

The wheels 22 can thus be driven either via the first electric drive motor 16 or via the second electric drive motor 18. It is also possible for the wheels 22 to be driven simultaneously by both electric drive motors 16, 18.

It is always the case here that that motor of the electric drive motors 16, 18 which is used to drive the wheels 22 is coupled in terms of drive to the summing transmission assembly 14 by means of the associated clutch assembly 12. That motor of the electric drive motors 16, 18 which is not used to drive the wheels 22 is uncoupled in terms of drive from the summing transmission assembly 14 by means of the respectively assigned clutch assembly 12.

Both clutch assemblies 12 are of identical design in the exemplary embodiment illustrated.

The motor vehicle drive train 10 explained above is of purely electric configuration. Of course, it is also conceivable for one of the electric drive motors 16, 18 to be replaced by an internal combustion engine. The motor vehicle drive train 10 is then a hybrid one. Equally, it is possible, instead of the two electric drive motors, to provide two internal combustion engines.

Figure 2:
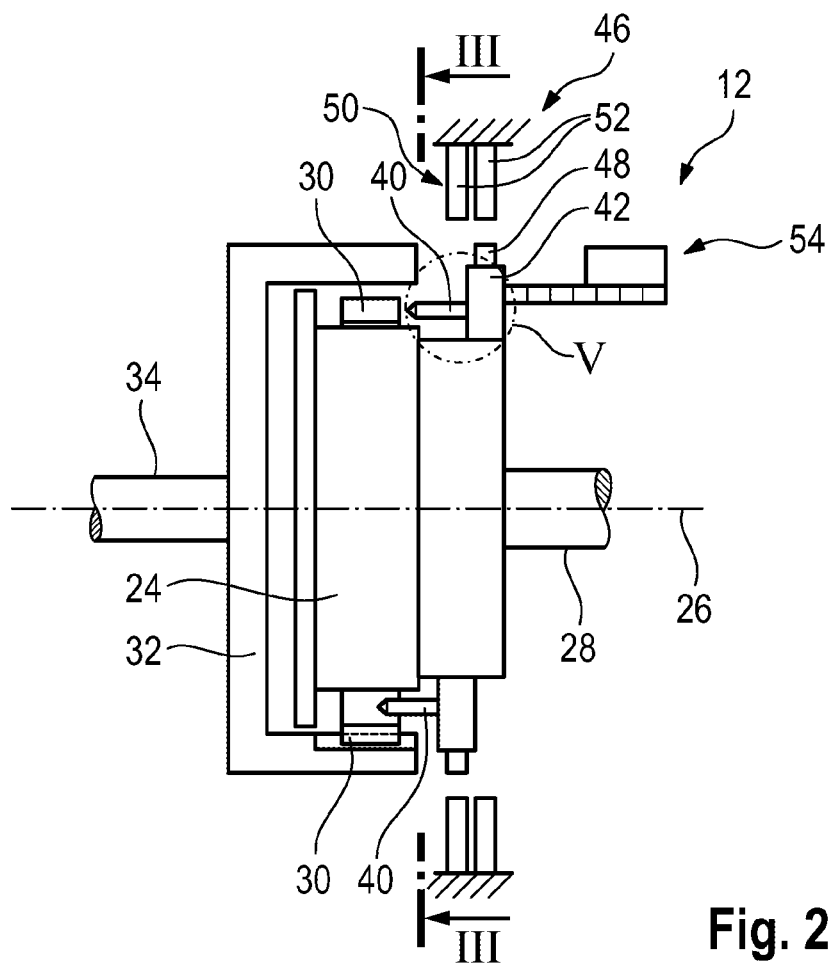
FIG. 2 shows a clutch assembly according to an embodiment of the invention in a schematic illustration.

FIG. 2 shows one of the clutch assemblies 12 in detail.

It comprises a pawl carrier 24 which, in the exemplary embodiment illustrated, is connected in a rotationally fixed manner to a first coupling element 28 which can be rotated about an axis of rotation 26, with the coupling element 28 being a shaft.

Figure 3:
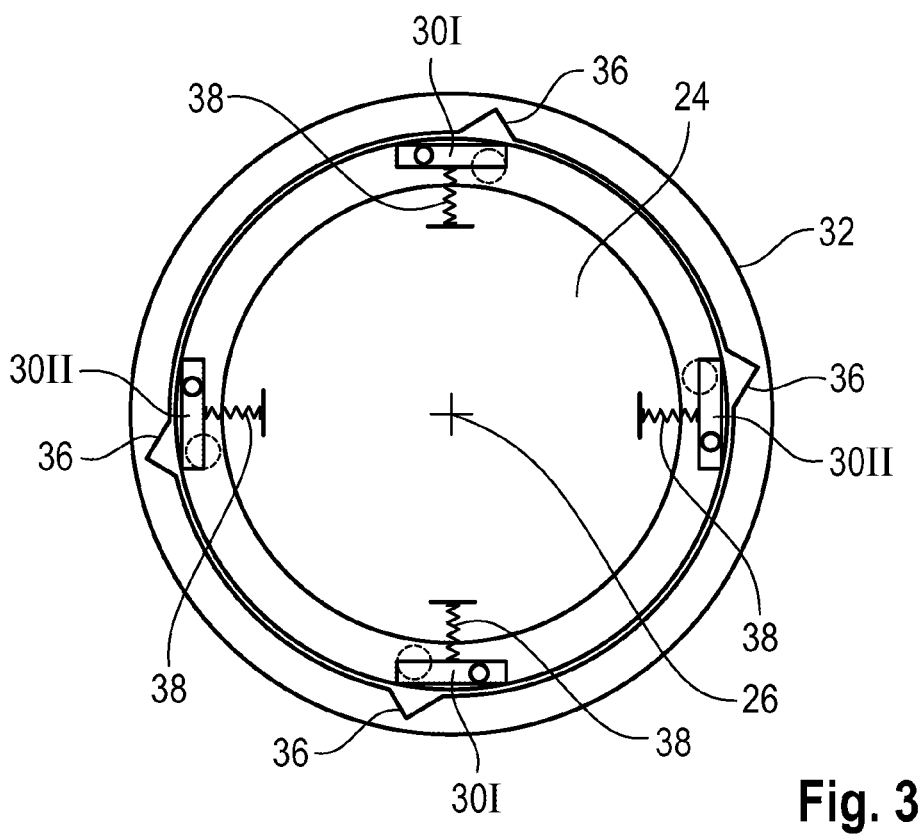
FIG. 3 shows a view of the clutch assembly from FIG. 2 along the direction III, with the clutch assembly being situated in the uncoupled state.
Figure 4:
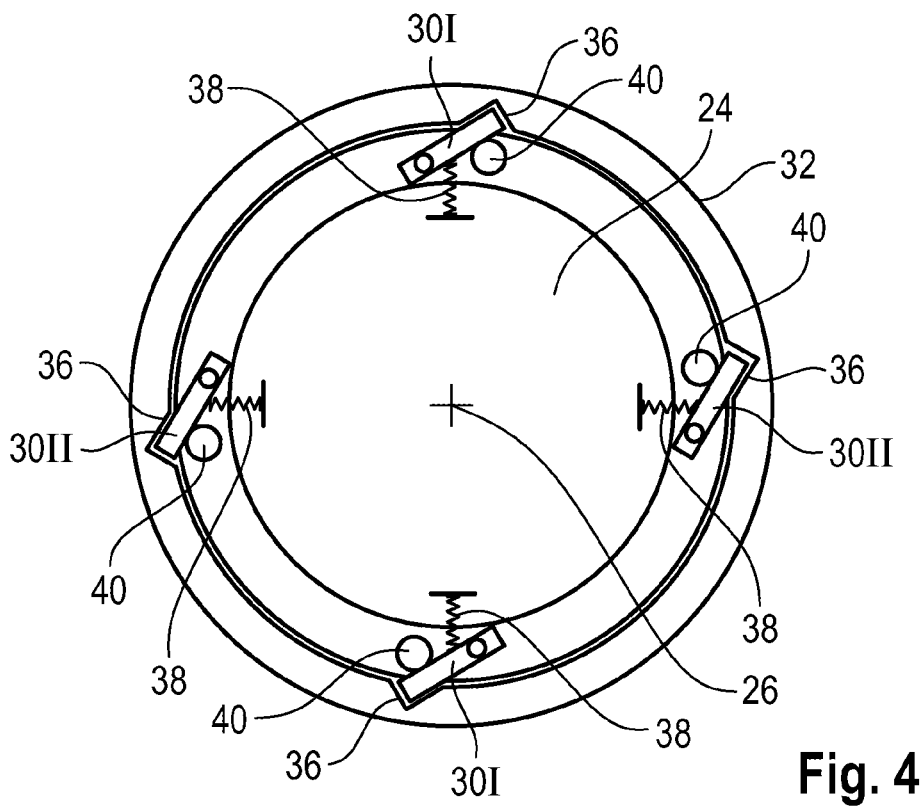
FIG. 4 shows the view from FIG. 3, but with the clutch assembly being situated in the coupled state.

A plurality of pawls 30 are pivotably fastened on the pawl carrier 24 (see also FIGS. 3 and 4).

Furthermore, the clutch assembly 12 comprises a pawl counter element 32 which, in the embodiment illustrated, is connected in a rotationally fixed manner to a second coupling element 34 which can be rotated about the axis of rotation 26.

The second coupling element 34 is also a shaft.

The clutch assembly 12 can assume two states.

In a coupled state, which is illustrated in the lower half of FIG. 2 and in FIG. 4, each of the pawls 30 engages in the circumferential direction in a form-fitting manner into a respectively assigned coupling recess 36 provided on the pawl counter element 32.

Consequently, in the coupled state, the pawl carrier 24 and the pawl counter element 32 are coupled with one another in a rotationally fixed manner.

As is particularly apparent from FIGS. 3 and 4, the pawls 30 form two groups. The reference signs of the pawls 30 of a first group are here each followed by an "I".

It is possible by means of these pawls 30I for the pawl carrier 24 to be coupled with the pawl counter element 32 in a rotationally fixed manner, with this rotationally fixed coupling acting in a first direction of rotation of the pawl carrier 24, which corresponds to the clockwise direction in FIGS. 3 and 4.

The reference signs of the pawls 30 of a second group are each followed by an "II". They can bring about a rotationally fixed coupling of the pawl carrier 24 with the pawl counter element 32 that acts in a second direction of rotation. Here, the second direction of rotation is opposite to the first direction of rotation. It thus corresponds in FIGS. 3 and 4 to a rotation of the pawl carrier 24 in the counter-clockwise direction.

In the present case, only two pawls 30 of the first group and two pawls 30 of the second group are illustrated by way of example. In principle, however, the number of pawls 30 can be freely selected.

The clutch assembly 12 can also assume an uncoupled state, which is illustrated in the upper half of FIG. 2 and in FIG. 3.

In the uncoupled state, the pawls 30 are positioned outside the respectively assigned coupling recesses 36.

The pawl counter element 32 and the pawl carrier 24 are thus rotationally uncoupled from one another. The same applies to the first coupling element 28 connected to the pawl carrier 24 and to the second coupling element 34 connected to the pawl counter element 32.

In order that the clutch assembly 12 always assumes a defined position, the pawls 30 are urged into a first pawl position by means of a respectively assigned spring 38.

In the exemplary embodiment illustrated in FIGS. 3 and 4, the springs 38 take the form of tension springs, with the result that the pawls 30 assume the first pawl position in the uncoupled state of the clutch assembly 12. In other words, the clutch assembly 12 is a so-called normally-open clutch which in the unactuated state is situated in the uncoupled state.

In the coupled state, the pawls 30 assume a second pawl position.

The pawls 30 can be transferred into this second pawl position counter to the urging of the respectively assigned spring 38 by means of a respectively assigned actuating tappet 40 mounted on the pawl carrier 24.

It is possible by means of the actuating tappets 40 for the respectively assigned pawls 30 thus to be pressed or urged into the second pawl position.

For this purpose, the actuating tappets 40 are mounted on the pawl carrier 24 via an annular carriage 42 in such a way that the carriage 42 is displaceable with respect to the pawl carrier 24 only along the axis of rotation 26. Depending on the displacement position of the carriage 42, the pawls 30 are thus moved by the respectively assigned actuating tappets 40 into the second pawl position or not.

The contact surface 44 of each of the actuating tappets 40 via which it interacts with the respectively assigned pawl 30 tapers in the direction of the pawl-side tappet end.

Figure 5:
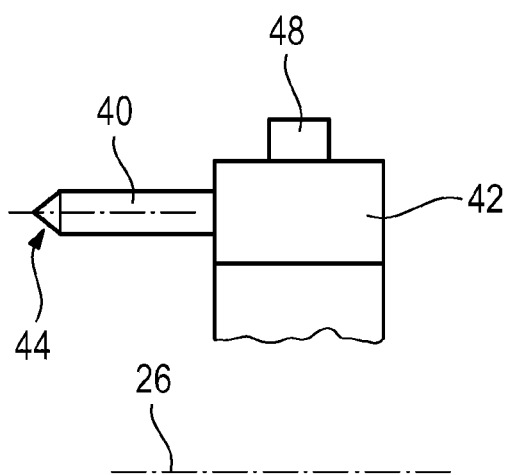
FIG. 5 shows a detail V of the clutch assembly from FIG. 2.

In the embodiment illustrated, the contact surface 44 is a cone surface (see in particular FIG. 5).

Moreover, the actuating tappets 40 are rigidly attached to the carriage 42 at least in the direction of the axis of rotation 26. In particular, the actuating tappets 40 are thus not movable with respect to the carriage 42 in the direction of the axis of rotation 26.

Furthermore, the actuating tappets 40 are fastened to the carriage 42 without intermediate elements. They thus engage directly on the carriage 42.

In order to move the actuating tappets 40, the carriage 42 is connected to an actuator 46 in such a way that it is movable along the axis of rotation 26 at least into a first carriage position and a second carriage position.

Here, the first carriage position is associated with the coupled state of the clutch assembly 12, and the second carriage position is associated with the uncoupled state of the clutch assembly 12.

For this purpose, the actuator 46 comprises a carriage-side magnet arrangement 48 which is configured as a permanent magnet ring in the embodiment illustrated.

Furthermore, the actuator 46 comprises a stator-side magnet arrangement 50 which comprises two magnet coils 52 in the embodiment illustrated, with the magnet coil 52 illustrated on the left in FIG. 2 being associated with the coupled state and the magnet coil 52 illustrated on the right in FIG. 2 being associated with the uncoupled state.

The carriage-side magnet arrangement 48 can be acted upon by means of the stator-side magnet arrangement 50, that is to say via the magnet coils 52. As a result, the carriage 42 can be moved into the first carriage position and the second carriage position.

Furthermore, the carriage-side magnet arrangement 48 and the stator-side magnet arrangement 50 act as a magnetic spring element via which the carriage 42 is supported on the stator. Here, the stator is for example mounted in a housing (not illustrated in further detail) of the clutch assembly 12.

The clutch assembly 12 additionally comprises a sensor arrangement 54, which is merely illustrated in a stylized manner in FIG. 2.

It is possible by means of this sensor arrangement 54 for a position of the carriage 42 along the axis of rotation 26 to be detected.

By virtue of the rigid coupling of the actuating tappets 40 with the carriage 42, a position of the actuating tappets 40 can thus also be indirectly detected by way of the sensor arrangement 54.

The position of the actuating tappets 40 in turn allows the setting of the pawls 30 to be derived, with the result that ultimately the sensor arrangement 54 can be used to detect the position or setting of the pawls 30 and it can thus be detected whether the clutch assembly 12 is situated in the uncoupled state or in the coupled state.

In the embodiment illustrated, the sensor arrangement 54 and the actuator 46 are constituent parts of a position control circuit for the carriage 42. Therefore, the position of the carriage 42 along the axis of rotation 26 can be controlled.

What is claimed is:

1. A clutch assembly for a motor vehicle drive train, comprising:
   a pawl carrier which is couplable in a rotationally fixed manner to a first coupling element which is rotatable about an axis of rotation, wherein a plurality of pawls are pivotably fastened on the pawl carrier;
   a pawl counter element which is couplable in a rotationally fixed manner to a second coupling element which is rotatable about the axis of rotation,
   wherein, in a coupled state, each of the pawls engages in the circumferential direction in a form-fitting manner into a coupling recess provided on the pawl counter element, with a result that the pawl carrier and the pawl counter element are coupled in a rotationally fixed manner at least in one direction of rotation,
   wherein, in an uncoupled state, each of the pawls are positioned outside the coupling recesses, with a result that the pawl counter element and the pawl carrier are rotationally uncoupled from one another,
   wherein each of the pawls is urged into a first pawl position via a respectively assigned spring,
   wherein each of the pawls is movable into a second pawl position counter to the urging of the respectively assigned spring via a respectively assigned actuating tappet mounted on the pawl carrier, and
   wherein the actuating tappets are mounted on the pawl carrier via a carriage and are rigidly connected to the carriage in the direction of the axis of rotation,
   the clutch assembly further comprising a sensor arrangement by which a position of the carriage along the axis of rotation is detectable.

2. The clutch assembly according to claim 1, wherein in the uncoupled state, the pawls assume the first pawl position and, in the coupled state, the pawls assume the second pawl position.

3. The clutch assembly according to claim 1, wherein the carriage is displaceable with respect to the pawl carrier only along the axis of rotation.

4. The clutch assembly according to claim 1, wherein the actuating tappets are each connected to the carriage without intermediate elements.

5. The clutch assembly according to claim 1, wherein the carriage is connected to an actuator such that the carriage is movable along the axis of rotation at least into a first carriage position and a second carriage position, and
the first carriage position is associated with the coupled state and the second carriage position is associated with the uncoupled state.

6. The clutch assembly according to claim 5, wherein the actuator comprises a carriage-side magnet arrangement which is connected to the carriage, and the carriage-side magnet arrangement is acted upon by a stator-side magnet arrangement.

7. The clutch assembly according to claim 6, wherein the carriage-side magnet arrangement and the stator-side magnet arrangement act as a magnetic spring element via which the carriage is supported on the stator.

8. The clutch assembly according to claim 1, further comprising:
a position control circuit for the carriage which comprises the actuator and the sensor arrangement, with a result that a position of the carriage along the axis of rotation is controlled.

9. The clutch assembly according to claim 1, wherein each of the actuating tappets interacts with the respectively assigned pawl via a contact surface which tapers in the direction of the pawl-side tappet end.

10. The clutch assembly according to claim 9, wherein the contact surface comprises a cone portion.

11. The clutch assembly according to claim 1, wherein the pawls form two groups,
the pawls of a first group produce rotationally fixed coupling of the pawl carrier with the pawl counter element in a first direction of rotation, and
the pawls of a second group produce rotationally fixed coupling of the pawl carrier with the pawl counter element in a second direction of rotation, wherein the second direction of rotation is opposite to the first direction of rotation.

12. A motor vehicle drive train comprising a clutch assembly according to claim 1.

13. The motor vehicle drive train according to claim 12, wherein
the clutch assembly acts in a summing transmission assembly by which:
a first electric drive motor and/or a second electric drive motor, or
the first electric drive motor and/or an internal combustion engine, are couplable to a torque output of the motor vehicle drive train in a torque-transmitting manner.

14. A motor vehicle drive train comprising:
a clutch assembly comprising:
a pawl carrier which is couplable in a rotationally fixed manner to a first coupling element which is rotatable about an axis of rotation, wherein a plurality of pawls are pivotably fastened on the pawl carrier;
a pawl counter element which is couplable in a rotationally fixed manner to a second coupling element which is rotatable about the axis of rotation,
wherein, in a coupled state, each of the pawls engages in the circumferential direction in a form-fitting manner into a coupling recess provided on the pawl counter element, with a result that the pawl carrier and the pawl counter element are coupled in a rotationally fixed manner at least in one direction of rotation,
wherein, in an uncoupled state, each of the pawls are positioned outside the coupling recesses, with a result that the pawl counter element and the pawl carrier are rotationally uncoupled from one another,
wherein each of the pawls is urged into a first pawl position via a respectively assigned spring,
wherein each of the pawls is movable into a second pawl position counter to the urging of the respectively assigned spring via a respectively assigned actuating tappet mounted on the pawl carrier, and
wherein the actuating tappets are mounted on the pawl carrier via a carriage and are rigidly connected to the carriage in the direction of the axis of rotation, wherein the clutch assembly acts in a summing transmission assembly by which:
a first electric drive motor and/or a second electric drive motor, or
the first electric drive motor and/or an internal combustion engine, are couplable to a torque output of the motor vehicle drive train in a torque-transmitting manner.

15. The motor vehicle drive train according to claim 14, wherein
in the uncoupled state, the pawls assume the first pawl position and, in the coupled state, the pawls assume the second pawl position.

16. The motor vehicle drive train according to claim 14, wherein
the carriage is displaceable with respect to the pawl carrier only along the axis of rotation.

17. The motor vehicle drive train according to claim 14, wherein
the carriage is connected to an actuator such that the carriage is movable along the axis of rotation at least into a first carriage position and a second carriage position, and
the first carriage position is associated with the coupled state and the second carriage position is associated with the uncoupled state.

18. The motor vehicle drive train according to claim 17, wherein
the actuator comprises a carriage-side magnet arrangement which is connected to the carriage, and
the carriage-side magnet arrangement is acted upon by a stator-side magnet arrangement.

19. The motor vehicle drive train according to claim 18, wherein
the carriage-side magnet arrangement and the stator-side magnet arrangement act as a magnetic spring element via which the carriage is supported on the stator.

20. The motor vehicle drive train according to claim 14, wherein
the pawls form two groups,
the pawls of a first group produce rotationally fixed coupling of the pawl carrier with the pawl counter element in a first direction of rotation, and
the pawls of a second group produce rotationally fixed coupling of the pawl carrier with the pawl counter element in a second direction of rotation, wherein the second direction of rotation is opposite to the first direction of rotation.

* * * * *